(12) United States Patent
Moerters et al.

(10) Patent No.: US 7,541,014 B2
(45) Date of Patent: Jun. 2, 2009

(54) PYROGENICALLY PRODUCED SILICA

(75) Inventors: Martin Moerters, Rheinfelden (DE); Hauke Jacobsen, Mobile, AL (US); Kai Schumacher, Hofheim (DE)

(73) Assignee: Degussa AG, Duesseldorf (DE)

( * ) Notice: Subject to any disclaimer, the term of this patent is extended or adjusted under 35 U.S.C. 154(b) by 364 days.

(21) Appl. No.: 10/530,284

(22) PCT Filed: Dec. 16, 2003

(86) PCT No.: PCT/EP03/14326

§ 371 (c)(1), (2), (4) Date: Apr. 5, 2005

(87) PCT Pub. No.: WO2004/054928

PCT Pub. Date: Jul. 1, 2004

(65) Prior Publication Data

US 2006/0093543 A1 May 4, 2006

(30) Foreign Application Priority Data

Dec. 17, 2002 (DE) ................................ 102 58 858

(51) Int. Cl.
| | |
|---|---|
| *C01B 33/12* | (2006.01) |
| *C01B 33/141* | (2006.01) |
| *D21H 11/00* | (2006.01) |
| *D21H 13/00* | (2006.01) |
| *D21H 15/00* | (2006.01) |
| *D21H 17/00* | (2006.01) |
| *D21H 19/00* | (2006.01) |
| *D21H 21/00* | (2006.01) |
| *D21H 25/00* | (2006.01) |

(52) U.S. Cl. .................... 423/335; 423/337; 162/181.4; 162/181.6; 516/81

(58) Field of Classification Search ................. 423/335
See application file for complete search history.

(56) References Cited

U.S. PATENT DOCUMENTS 5,959,005 A * 9/1999 Hartmann et al. ........... 523/213

(Continued)

FOREIGN PATENT DOCUMENTS

EP 0 759 410 2/1997

(Continued)

OTHER PUBLICATIONS

Evonik Degussa, Physical Properties of Aerosil OX 50. (2000).*

(Continued)

*Primary Examiner*—Jennifer A Smith
(74) *Attorney, Agent, or Firm*—Oblon, Spivak, McClelland, Maier & Neustadt, P.C.

(57) ABSTRACT

Pyrogenically produced silica powder with a BET surface of 30 to 90 $m^2/g$, a dibutyl phthalate number of at least 80 and a tamped density of no more than 110 g/l. It is produced in that at least one vaporous silicon compound, a gas containing free oxygen and a combustible gas are mixed together in a closed burner and then burnt in a flame in the flame tube of the burner, the solid obtained is separated from the gas mixture and optionally purified, wherein the oxygen content of the gas containing free oxygen is adjusted such that the lambda value is greater than or equal to 1, and the gamma value is between 1.2 and 1.8. It can be used in toner applications.

13 Claims, 1 Drawing Sheet

U.S. PATENT DOCUMENTS

Figure 1:
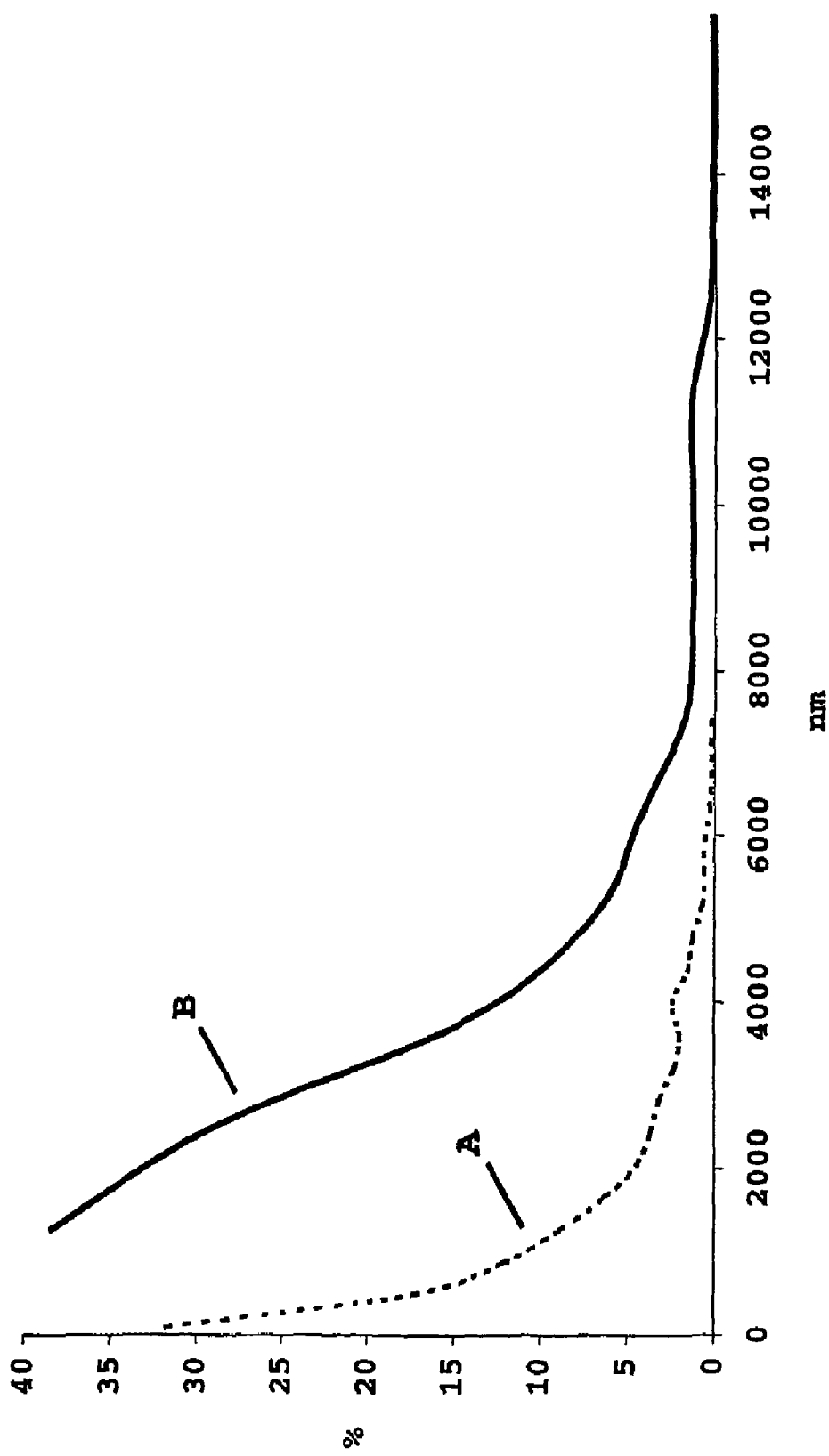

2004/0253164 A1 12/2004 Mangold et al.
2005/0244642 A1* 11/2005 Meyer et al. ................ 428/405
2006/0093543 A1* 5/2006 Morters et al. .............. 423/335
2006/0154994 A1* 7/2006 Schumacher et al. .......... 516/81

FOREIGN PATENT DOCUMENTS

EP 0 808 880 11/1997
EP 1 182 168 2/2002
JP 2000169132 A * 6/2000

OTHER PUBLICATIONS

U.S. Appl. No. 11/084,022, filed Mar. 21, 2005, Schumacher, et al.
U.S. Appl. No. 11/084,170, filed Mar. 21, 2005, Schumacher, et al.
U.S. Appl. No. 11/085,151, filed Mar. 22, 2005, Schumacher, et al.
U.S. Appl. No. 10/530,284, filed Apr. 5, 2005, Moerters, et al.
U.S. Appl. No. 10/530,491, filed Apr. 6, 2005, Moerters, et al.
U.S. Appl. No. 10/549,929, filed Sep. 20, 2005, Schumacher, et al.
U.S. Appl. No. 11/055,605, filed Feb. 11, 2005, Schumacher, et al.
U.S. Appl. No. 10/524,037, filed Feb. 9, 2005, Schumacher, et al.

* cited by examiner

PYROGENICALLY PRODUCED SILICA

The invention provides a pyrogenically produced silica powder, the production thereof and its use.

The term fumed silica or pyrogenic silica covers all highly disperse silicas which are obtained in the gas phase at high temperatures by coagulation of monomeric silica. There are two processes for the technical production of pyrogenic silicas: high-temperature hydrolysis and the electric-arc process.

In the high-temperature hydrolysis process, a homogeneous mixture of a vaporous silicon compound, generally silicon tetrachloride, hydrogen, oxygen and an inert gas is burnt with a burner in a cooled combustion chamber. During this process, the following reactions take place simultaneously:

$$2H_2 + O_2 \rightarrow 2H_2O \qquad 1.$$

$$SiCl_4 + 2H_2O \rightarrow SiO_2 + 4HCl \qquad 2.$$

Because of the homogeneity of the gas mixture, the reaction conditions and thus the conditions for the formation and growth of each $SiO_2$ particle are largely identical, so that very uniform and even particles can form. In the known process, air is used as the source of oxygen. The pyrogenic silicas produced by the known process have specific surfaces of between 10 and 600 $m^2/g$.

EP-A-759410 describes the production of a pyrogenic silica powder with a surface area of less than 90 $m^2/g$, preferably less than 60 $m^2/g$, and a dibutyl phthalate number (DBP number), expressed as g of dibutyl phthalate/100 g of silica powder, of less than 60. The DBP number is a measure of the structure or the degree of fusion of the particles of the powder. A low structure is expressed by a low DBP number. The silica powder described in EP-A-759410 accordingly exhibits a comparatively low structure with a comparatively low surface area. An essential feature of the process for the production of the powder is the preheating of the mixture of silicon compound and air to temperatures of approx. 400 degrees Celsius.

The combination of low surface area and low structure is explained further in EP-A-1182168. Dispersions of the silica powder produced there have particularly low viscosity. The basic silica powder has little structuring.

The prior art describes silica powder with a low surface area and with a low structure. However, it is not possible to produce a silica powder by the processes described in EP-A-759410 and EP-A-1182168, for example, which has a similarly low surface area but is clearly more strongly structured. A material like this could, for example, be used where a high thickening action is desirable with a low surface area.

The object of the invention thus consists in providing a silica powder which is highly structured compared with the prior art, with a low BET surface area.

The invention provides a pyrogenically produced silica powder, which is characterised in that it has a BET surface area of 30 to 90 $m^2/g$,
a DBP number of at least 80, expressed as g of dibutyl phthalate/100 g of silica and
a tamped density of no more than 110 g/l.

The BET surface area can preferably be between 35 and 75 $m^2/g$, and particularly preferably between 35 and 55 $m^2/g$. The BET surface area is determined in accordance with DIN 66131.

The DBP number can preferably be greater than 100 and particularly preferably greater than 110. For the DBP absorption, the force uptake, or the torque (in Nm), of the rotating blades of the DBP measuring instrument is measured on addition of defined quantities of DBP, comparable to a titration. A sharply defined maximum is obtained for the powder according to the invention, with a subsequent drop at a specific addition of DBP.

The tamped density is determined on the basis of DIN ISO 787/XI K 5101/18 (not sieved). The tamped density can be altered by further process steps, such as bagging or rolling. In the powder according to the invention, regardless of this, it is less than 110 g/l. It can preferably be less than 100 g/l.

It can also be preferred if the silica powder according to the invention has an average-aggregate circumference of at least 1000 nm. An average aggregate circumference of at least 1200 nm is particularly preferred. The aggregate circumference can be determined e.g. by image analysis of the TEM images. Aggregate, within the meaning of the invention, refers to primary particles of similar structure and size which have fused together, the surface area of which is smaller than the sum of the individual, isolated primary particles. The term primary particles, within the meaning of the invention, refers to particles that are initially formed in the reaction and can coalesce as the reaction progresses to form aggregates.

In addition, the kurtosis (steepness), which is a measure of the type of distribution at the edges, of the aggregate area of the powder according to the invention can be at least 20 according to ASTM 3849-89.

The silica powder according to the invention can have a pH value, measured in a 4% aqueous dispersion, of between 3.8 and 5.

A pyrogenically produced silica powder having a BET surface area of 35 to 55 $m^2/g$, a DBP number of 100 to 130 g dibutyl phthalate/100 g silica and a pH value, measured in a 4% aqueous dispersion, of 4.3 to 4.8 can be particularly preferred.

The invention also provides a process, which is characterised in that at least one vaporous silicon compound, a gas containing free oxygen (primary air) and a combustible gas are mixed together in a closed burner and then burnt in a flame in the flame tube of the burner, the solid obtained is separated from the gas mixture and optionally purified, wherein the oxygen content of the gas containing free oxygen is adjusted such that the lambda value is greater than or equal to 1, and
the gamma value is between 1.2 and 1.8.

Adjustment to a gamma value of 1.4 to 1.6 can preferably be made.

In the closed burner method, the reaction mixture burns in a flame tube closed to the atmosphere. By comparison, in the open method the reaction mixture would burn in a flame tube open to the atmosphere.

In a preferred embodiment, $1 \leq lambda \leq 1.2$ applies.

It is also preferred that, in addition, secondary air is introduced into the flame tube, the ratio of secondary air/primary air being $\leq 1.1$.

It is also preferred that the proportion of oxygen in the gas containing free oxygen is between 30 and 40 vol. %.

As silicon-containing compounds, silicon halides, organochlorosilicon compounds or organosilicon compounds and mixtures of the above compounds can preferably be used. Silicon tetrachloride, methyltrichlorosilane or tetramethoxysilane can particularly preferably be used.

In a particularly preferred embodiment of the process according to the invention, it applies that $1 \leq lambda \leq 1.2$, $1.2 \leq gamma \leq 1.8$, the ratio of secondary air/primary air $\leq 1.1$, the proportion of oxygen in the gas containing free oxygen is between 30 and 40 vol. % and the silicon compound is silicon tetrachloride.

The invention also provides the use of the silica powder according to the invention for toner applications, in the silicone and rubber industry, to adjust the rheology of liquid systems, for the production of dispersions, as a filler, for the film-coating of polyethylene terephthalate and polyvinyl acetate, in lacquers and paints.

EXAMPLES

The dibutyl phthalate absorption is measured with a RHEOCORD 90 instrument from Haake, Karlsruhe. For this purpose, 12 g of the silica powder, to an accuracy of 0.001 g, are charged into a kneading chamber, this is sealed with a lid and dibutyl phthalate is metered in through an aperture in the lid at a preset metering rate of 0.0667 ml/s. The kneader is operated at a motor speed of 125 revolutions per minute. After reaching the maximum torque, the kneader and the DBP metering are automatically switched off. The DBP absorption is calculated from the quantity of DBP consumed and the quantity of the particles weighed in according to the following:

DBP number (g/100 g)=(DBP consumption in g/quantity of powder weighed in, in g)×100.

The pH is determined on the basis of DIN ISO 787/IX, ASTM D 1280, JIS K 5101/24.

The image analyses are performed using a TEM instrument from Hitachi H 7500 and a MegaView II CCD camera from SIS. The image enlargement for the evaluation was 30000:1 with a pixel density of 3.2 nm. The number of particles evaluated was greater than 1000. Preparation took place in accordance with ASTM 3849-89. The lower threshold limit with respect to detection was 50 pixels.

Lambda is the ratio of supplied oxygen in the core to stoichiometrically required oxygen.

Gamma is the ratio of supplied hydrogen in the core to stoichiometrically required hydrogen.

Example 1 (Comparative Example)

500 kg/h of $SiCl_4$ are evaporated at approx. 90° C. and transferred into the central tube of an open burner of known design. In addition, 145 $Nm^3$/h of hydrogen and 207 $Nm^3$/h of air with an oxygen proportion of 35 vol. % are fed into this tube. This gas mixture is ignited and burns in the flame tube of the water-cooled burner. An additional 15 $Nm^3$/h of hydrogen are fed into an outer nozzle surrounding the central nozzle, to avoid any caking. An additional 250 $Nm^3$/h of air of normal composition are fed into the flame tube. After the reaction gases have cooled, the pyrogenic silica powder is separated from the gases containing hydrochloric acid using a filter and/or a cyclone. In a deacidification unit, the pyrogenic silica power is treated with water vapour and air.

Example 2 (Embodiment Example)

500 kg/h of $SiCl_4$ are evaporated at approx. 90° C. and transferred into the central tube of a closed burner of known design. An additional 160 $Nm^3$/h of hydrogen and 238 $Nm^3$/h of air with an oxygen proportion of 34 vol. % are fed into this tube. This gas mixture is ignited and burns in the flame tube of the water-cooled burner. In addition, 15 $Nm^3$/h of hydrogen are fed into an outer nozzle surrounding the central nozzle, to avoid any caking. An additional 250 $Nm^3$/h of air of normal composition are fed into the flame tube.

After the reaction gases have cooled, the pyrogenic silica powder is separated from the gases containing hydrochloric acid using a filter and/or a cyclone. In a deacidification unit, the pyrogenic silica powder is treated with water vapour and air.

The powders 3 to 5 according to the invention and comparative example 6 are produced as in example 2. The experimental conditions are given in Table 1. The analytical data of the powders 1 to 6 are given in Table 2.

TABLE 1

Experimental conditions and flame parameters calculated therefrom

| | | Example | | | | | |
|---|---|---|---|---|---|---|---|
| | | 1 | 2 | 3 | 4 | 5 | 6 |
| $SiCl_4$ | kg/h | 500 | 500 | 500 | 500 | 500 | 500 |
| $H_2$ core | $Nm^3$/h | 145 | 160 | 190 | 210 | 240 | 318 |
| Air | $Nm^3$/h | 207 | 238 | 326 | 371 | 405 | 500 |
| Oxygen content of air | vol. % | 35 | 34 | 34 | 34 | 34 | 34 |
| Additional air (secondary air) | Nm3/h | 250 | 250 | 250 | 250 | 250 | 250 |
| $H_2$ mantle | $Nm^3$/h | 15 | 15 | 15 | 15 | 15 | 15 |
| lambda | | 1.1 | 1.0 | 1.0 | 1.0 | 1.0 | 1.0 |
| gamma | | 1.0 | 1.2 | 1.4 | 1.6 | 1.8 | 2.4 |

TABLE 2

Analytical data of the silica powders 1-6

| | | Example | | | | | |
|---|---|---|---|---|---|---|---|
| | | 1 | 2 | 3 | 4 | 5 | 6 |
| BET | $m^2$/g | 46 | 43 | 46 | 50 | 46 | 96 |
| DBP | g/100 g | 76 | 91 | 96 | 107 | 127 | 127 |
| Tamped density$^{(\$)}$ | g/l | 53 | 38 | 33 | 28 | 25 | 28 |
| pH$^{(\#)}$ | | 4.5 | 4.5 | 4.7 | 4.7 | 4.8 | 4.6 |

$^{(\$)}$direct from the process after purification step;
$^{(\#)}$4 wt.-% disp.

Table 2 shows that the examples 2 to 5 according to the invention with increasing gamma and constant lambda lead to silica powders with approximately the same BET surface area but increasing structure (larger DBP number). At the same time, the tamped density of the powders, determined directly from the process, decreases as gamma increases. At gamma values of more than 1.8 it was found that the desired low surface area of the powder can no longer be achieved. Example 6 shows that, while it is true that the DBP number is >110 g/100 g with a gamma of 2.4, this is attributable to the clearly increased surface area.

With a gamma value of 1.8, the process can be operated sufficiently economically and the resulting powders exhibit the desired surface area and the desired degree of high structure.

TABLE 3

Aggregate structure of the silica powders of Examples 1, 3 and 4 by image analysis.

| Example | av. area $nm^2$ | av. circumference nm | ø$^{(*)}$ max nm | ø min nm | Elongation nm | Kurtosis area | SF$^{(\#)}$ |
|---|---|---|---|---|---|---|---|
| 1 | 23217 | 1032 | 292 | 207 | 1.78 | 14.41 | 39.1 |
| 3$^{(\$)}$ | 32780 | 1475 | 303 | 186 | 2.02 | 27.27 | 88.7 |
| 4$^{(\$)}$ | 29577 | 1447 | 293 | 179 | 2.01 | 25.38 | 101.1 |

TABLE 3-continued

Aggregate structure of the silica powders of Examples 1, 3 and 4 by image analysis.

| Example | av. area nm$^2$ | av. circumference nm | ø$^{(*)}$ max nm | ø min nm | Elongation nm | Kurtosis area | SF$^{(\#)}$ |
|---|---|---|---|---|---|---|---|
| 3$^{(\&)}$ | 26217 | 1313 | 279 | 141 | 2.01 | 21.49 | 82.9 |
| 4$^{(\&)}$ | 24527 | 1257 | 259 | 161 | 2.00 | 24.76 | 97.1 |

$^{(*)}$ø = Diameter;
$^{(\#)}$Sphericity Factor acc. to ASTM;
$^{(\$)}$Powder before compacting;
$^{(\&)}$Powder after compacting FIG. 1 shows a circumference distribution of aggregates. It shows the relative frequency (in %) with which a certain range of the aggregate diameter (in nm) occurs in the powder. The x-axis should be read here as: up to 1000 nm, up to 1001 to 2000 nm, 2001 to 3000 nm etc.

A refers to the distribution of the aggregate circumference of a powder not according to the invention with a BET surface area of approx. 50 m$^2$/g. B shows the distribution of the aggregate circumference from the powder according to the invention from Example 2. The clearly broader distribution of the aggregates of the powder according to the invention can be seen.

The invention claimed is:

1. A pyrogenically produced silica powder comprising particles each having a homogenous composition, wherein the pyrogenically produced silica powder has a BET surface of 30 to 90 m$^2$/g, a DBP number of at least 80, expressed as g of dibutyl phthalate/100 g of silica and a tamped density of no more than 110 g/l, wherein the particles consist of silica.

2. The pyrogenically produced silica powder according to claim 1, wherein the average aggregate circumference is at least 1000 nm.

3. The pyrogenically produced silica powder according to claim 1, wherein the kurtosis of the aggregate area is at least 20.

4. The pyrogenically produced silica powder according to claim 1, wherein the pyrogenically produced silica powder has a pH value, measured in a 4 per cent aqueous dispersion, of between 3.8 and 5.

5. The pyrogenically produced silica powder according to claim 1, wherein
the BET surface is 35 to 55 m$^2$/g,
the DBP number is 100 to 130 g dibutyl phthalate/100 g silicon dioxide,
and the pH value, measured in a 4% aqueous dispersion, is 4.3 to 4.8.

6. A process for the production of the silica powder of claim 1, wherein at least one vaporous silicon compound, a gas containing free oxygen (primary air) and a combustible gas are mixed together in a closed burner and then burnt in a flame in the flame tube of the burner, the solid obtained is separated from the gas mixture and optionally purified, wherein
the oxygen content of the gas containing free oxygen is adjusted such that the lambda value is greater than or equal to 1, and
the gamma value is between 1.2 and 1.8.

7. The process according to claim 6, wherein 1≦lambda≦1.2.

8. The process according to claim 6, wherein in addition, secondary air is introduced into the flame tube, secondary air/primary air being ≦1.1.

9. The process according to claims 6, wherein the proportion of oxygen in the gas containing free oxygen is between 30 and 40 vol. %.

10. The process according to claim 6, wherein silicon halides, organochlorosilicon compounds or organosilicon compounds and mixtures of the above compounds are used as the silicon compound.

11. The process according to claim 6, wherein 1≦lambda≦1.2, 1.2≦gamma≦1.8, the ratio of secondary air/primary air is ≦1.1 and the proportion of oxygen in the gas containing free oxygen is between 30 and 40 vol. % and the silicon compound is silicon tetrachloride.

12. A method for adjusting the rheology of a liquid system comprising adding the pyrogenically produced silica powder as claimed in claim 1 to a liquid.

13. The pyrogenically produced silica powder according to claim 1, wherein the powder consists of silica.

* * * * *